US006270858B1

(12) United States Patent
Paulson

(10) Patent No.: US 6,270,858 B1
(45) Date of Patent: Aug. 7, 2001

(54) METHOD OF COATING USING AN INK JET PRINTABLE MIXTURE

(75) Inventor: Bradley A. Paulson, Northfield, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 08/969,324

(22) Filed: Nov. 13, 1997

Related U.S. Application Data

(63) Continuation-in-part of application No. 08/857,527, filed on May 16, 1997, now Pat. No. 6,051,306, which is a continuation-in-part of application No. 08/749,567, filed on Nov. 15, 1996, now abandoned.

(51) Int. Cl.$^7$ .......... C08J 7/04

(52) U.S. Cl. .......... 427/508; 427/261; 427/385.5; 427/407.1; 427/511; 427/558; 427/559; 427/595

(58) Field of Search .......... 427/487, 508, 427/261, 385.5, 407.1, 511, 558, 559, 595

(56) References Cited

U.S. PATENT DOCUMENTS

| | | | |
|---|---|---|---|
| 4,474,850 | 10/1984 | Burwasser | 428/336 |
| 4,528,242 | 7/1985 | Burwasser | 428/413 |
| 4,555,437 | 11/1985 | Tanck | 428/212 |
| 4,575,465 | 3/1986 | Viola | 427/261 |
| 4,578,285 | 3/1986 | Viola | 427/209 |
| 4,592,954 | 6/1986 | Malhotra | 428/335 |
| 4,650,714 | 3/1987 | Kojima et al. | 428/341 |
| 4,680,235 | 7/1987 | Murakami et al. | 428/414.4 |
| 4,732,786 | 3/1988 | Patterson et al. | 427/261 |
| 4,758,461 | 7/1988 | Akiya et al. | 428/212 |
| 4,770,934 | 9/1988 | Yamasaki et al. | 428/331 |
| 4,830,911 | 5/1989 | Kojima et al. | 428/342 |
| 4,839,200 | 6/1989 | Hoffman et al. | 427/265 |
| 4,877,678 | 10/1989 | Hasegawa et al. | 428/216 |
| 4,877,686 | 10/1989 | Riou et al. | 428/514 |
| 4,877,688 | 10/1989 | Senoo et al. | 428/522 |
| 4,900,620 | 2/1990 | Tokita et al. | 428/330 |
| 4,910,084 | 3/1990 | Yamasaki et al. | 428/411.1 |
| 4,926,190 | 5/1990 | Laver | 346/1.1 |
| 4,944,988 | 7/1990 | Yasuda et al. | 428/195 |
| 5,006,407 | 4/1991 | Malhotra | 428/336 |
| 5,041,328 | 8/1991 | Akiya et al. | 428/212 |
| 5,073,448 | 12/1991 | Vieira et al. | 428/331 |
| 5,084,340 | 1/1992 | Light | 428/327 |
| 5,096,781 | 3/1992 | Vieira et al. | 428/411.1 |
| 5,118,570 | 6/1992 | Malhotra | 428/474.4 |
| 5,120,601 | 6/1992 | Kotaki et al. | 428/327 |
| 5,124,201 | 6/1992 | Kurabayashi et al. | 428/323 |
| 5,126,193 | 6/1992 | Light | 428/327 |
| 5,126,194 | 6/1992 | Light | 428/327 |
| 5,137,778 | 8/1992 | Nakatsugawa et al. | 428/330 |
| 5,139,867 | 8/1992 | Light | 428/327 |
| 5,139,868 | 8/1992 | Mori et al. | 428/327 |
| 5,141,797 | 8/1992 | Wheeler | 428/195 |
| 5,165,973 | 11/1992 | Kojima et al. | 428/331 |
| 5,171,626 | 12/1992 | Nagamine et al. | 428/212 |
| 5,180,624 | 1/1993 | Kojima et al. | 428/211 |
| 5,185,213 | 2/1993 | Fujita et al. | 428/500 |
| 5,190,805 | 3/1993 | Atherton et al. | 428/195 |
| 5,194,317 | 3/1993 | Sato et al. | 428/195 |
| 5,206,071 | 4/1993 | Atherton et al. | 428/195 |
| 5,208,092 | 5/1993 | Iqbal | 428/195 |
| 5,213,873 | 5/1993 | Yasuda et al. | 428/195 |
| 5,246,774 | 9/1993 | Sakaki et al. | 428/323 |
| 5,266,383 | 11/1993 | Sakaki et al. | 428/195 |

(List continued on next page.)

*Primary Examiner*—Bernard Pianalto
(74) *Attorney, Agent, or Firm*—Westman, Champlin & Kelly, P.A.

(57) ABSTRACT

An image is printed onto a substrate having a surface. A coating is applied to the surface which includes a reactive water dispersible species and a solvent. An image is printed onto the coated substrate using an ink jet printer which supplies aqueous ink to thereby form the image on the substrate.

22 Claims, 1 Drawing Sheet

U.S. PATENT DOCUMENTS

| | | | | |
|---|---|---|---|---|
| 5,277,962 | | 1/1994 | Nakatsugawa et al. | 428/206 |
| 5,281,467 | | 1/1994 | Shimada et al. | 428/195 |
| 5,302,436 | | 4/1994 | Miller | 428/195 |
| 5,302,437 | | 4/1994 | Idei et al. | 428/195 |
| 5,320,897 | | 6/1994 | Kondo et al. | 428/195 |
| 5,328,748 | | 7/1994 | Westfal | 428/195 |
| 5,338,597 | | 8/1994 | Kurabayashi et al. | 428/195 |
| 5,352,503 | | 10/1994 | Drake et al. | 428/195 |
| 5,362,558 | | 11/1994 | Sakaki et al. | 428/323 |
| 5,364,702 | | 11/1994 | Idei et al. | 428/423.1 |
| 5,372,884 | | 12/1994 | Abe et al. | 428/331 |
| 5,623,001 | * | 4/1997 | Figov | 106/31.49 X |

* cited by examiner

METHOD OF COATING USING AN INK JET PRINTABLE MIXTURE

This is a Continuation-In-Part application of U.S. Ser. No. 08/857,527, filed May 16, 1997, U.S. Pat. No. 6,051,306, which is a Continuation-In-Part application of U.S. Ser. No. 08/749,567, filed Nov. 15, 1996 abd.

BACKGROUND OF THE INVENTION

The present invention relates to surfaces and coatings of surfaces useable in ink jet printing. More specifically, the present invention relates to a formulation for use in a coating for receiving ink jet printing.

Ink jet printers are known and provide a number of advantages in the printing process. For example, ink jet printers are capable of providing relatively high density color output at an acceptable printing speed. Further, such printers are relatively inexpensive. However, there are some surfaces on which it is difficult to print with an ink jet printer. For example, the ink from an ink jet printer typically does not adhere well to most polyester surfaces.

Fabricating receiving surfaces for ink jet ink is known in the art. Since ink jet ink is primarily aqueous, the receptive surface must be hydrophilic. Previous work indicates that acrylic resin, casein, cellulose, gelatin, gum arabic, maleic anhydride resin, melamine resin, polyaminoamide resins, poly acrylamide, polyacrylic acid, polyacrylate, polyalkylene glycol, polyethylene imine, polyethylene oxide, polysaccharides, polyvinyl alcohol, polyvinyl pyridine, polyvinyl pyrrolidone, sodium alginate, soy protein, starch, and urea resin, including derivatives and mixtures, can serve as the basis in obtaining an ink jet receptive material. (See, U.S. Pat. Nos. 4,474,850, 4,528,242, 4,555,437, 4,575,465, 4,578,285, 4,592,954, 4,650,714, 4,680,235, 4,732,786, 4,839,200, 4,877,678, 4,877,686, 4,877,688, 4,900,620, 4,944,988, 5,006,407, 5,084,340, 5,118,570, 5,120,601, 5,126,193, 5,126,194, 5,139,867, 5,139,868, 5,141,797, 5,180,624, 5,190,805, 5,206,071, 5,208,092, 5,213,873, 5,302,437, 5,328,748, 5,352,503, 5,364,702.)

As a consequence of being hydrophilic, the previously named compounds are generally water soluble. As such, significant work has been done to further polymerize or "cross-link" these compounds to increase their water resistance. For example, this has been done with polyfunctional aziridine (U.S. Pat. No. 5,208,092), boric acid (U.S. Pat. No. 4,877,686), carboxylate reactive cross-linkers (U.S. Pat. No. 4,732,786), plasticizers (U.S. Pat. Nos. 5,006,407 and 5,118,570), polyisocyanate, polyepichlorohydrin, or polymethylol (U.S. Pat. No. 5,139,868), polymeric high molecular weight quaternary ammonium salt (U.S. Pat. Nos. 4,830,911, 5,165,973 and 5,206,071), or titanium chelate (U.S. Pat. No. 5,141,797).

Additionally, the ink receptive material frequently contains a pigment or filler to aid in the absorbance and stability of the ink. These fillers are typically aluminum hydroxide, aluminum oxide, aluminum silicate, barium sulfate, calcium carbonate, calcium silicate, calcium sulfate clay, diatomaceous earth, kaolin, magnesium carbonate, magnesium oxalate, magnesium silicate, polystyrene, silicon dioxide, talc, tin hydroxide, titanium dioxide, zeolites, and zirconium hydroxide. (See, U.S. Pat. Nos. 4,758,461, 4,770,934, 4,877,678, 4,877,686, 4,900,620, 5,041,328, 5,124,201, 5,137,778, 5,165,973, 5,171,626, 5,180,624, 5,185,231, 5,190,805, 5,194,317, 5,213,873, 5,246,774, 5,266,383, 5,277,962, 5,281,467, 5,302,437, 5,320,897, 5,338,597, 5,362,558 and 5,372,884.)

Ink stabilizers are also frequently added to enhance the stability of the printed image. (See, U.S. Pat. Nos. 4,419,388, 4,926,190 and 5,096,781.) Such additives include carboxylic acids (U.S. Pat. No. 5,302,436), hydroquinone derivatives (U.S. Pat. No. 5,073,448), and poly(dialkanol allylamine) derivatives or poly(dialkanol modified alkylene glycol) (U.S. Pat. No. 4,910,084).

In general, the prior art has lacked a material which can be easily applied to form a printing surface on a substrate by screen printing, and can receive aqueous ink such as those inks which are for example, used in ink jet printers. Further, images formed on such prior art printing surfaces are not sufficiently water resistant and are easily smudged. Such printing surfaces are capable of bonding onto only a limited number of substrates. An ink receiving surface that reduces any of these problems would be particularly useful for use in printing onto CD recordable disks and identification cards.

SUMMARY OF THE INVENTION

The present invention includes a coating for coating a substrate which is adapted to receive ink from an ink jet printer. Preferably, the printed ink retains its definition and color characteristics after printing and is resistant to smudging and water. The substrate may comprise, for example, a CD recordable, or a PVC card such as an identification card in various embodiments.

The invention includes an ink receiving surface carried on a support layer (substrate). Typically, the ink receiving surface is a substantially water resistant coating layer which includes a polymer. In one aspect of the invention, a method is provided for printing an image. In the method, a substrate having a surface is obtained. A coating mixture is prepared which includes a substantially reactive water dispersible species, a sensitizer which acts to increase the susceptibility of the water dispersible species to polymerization in response to an initiator, and a solvent. The coating mixture is coated onto the surface of the substrate and polymerization of the water dispersible species is initiated using the initiator. Following polymerization, the coated substrate is placed in ink jet printer and a substantially aqueous ink jet ink is applied by the ink jet printer to form the image.

DETAILED DESCRIPTION OF THE PREFERRED EMBODIMENTS

Figure 1:
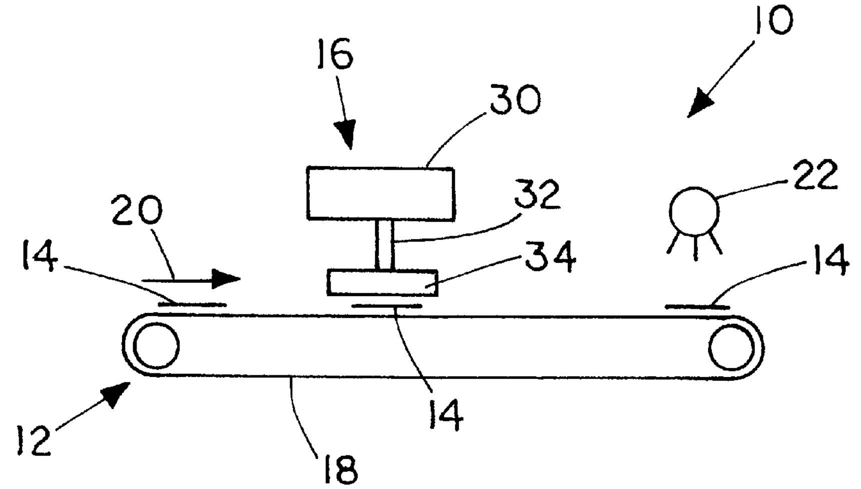
FIG. 1 is a simplified diagram showing a screen printing apparatus in accordance with the present invention.

The present invention provides a receiving surface adapted for receiving ink from an ink jet printer. The surface may take the form of a coating which coats a substrate upon which ink jet ink may be directly printed and can be deposited using screen printing techniques. One aspect of the invention includes providing a surface for receiving ink from an ink jet printer that reduces bleeding of the image, reduces drying time of the ink, exhibits reduced smudging of the image and provides high durability to water of both the image and the surface coating.

In the embodiments herein, the ink receiving surface may be coated on polymeric substrates, such as acrylics or surfaces such as for CD-ROMs, CD recordable, identification card, etc. The inventive formulation is adaptable to a wide variety of substrate surfaces. The formulation adheres to the surface and is adapted for receiving aqueous ink from, for example, an ink jet printer. A pigment, such as a white pigment, may be added to the formulation to provide a desired background color. The coating is substantially water resistant and will remain bonded to the substrate. Further, the ink jet ink when deposited on a surface in accordance with the invention is also substantially water resistant.

Typical prior art UV curable inks undergo complete phase transformation, with 100% of the liquid forming a solid during the polymerization. The complete conversion of the liquid ink to a solid surface makes the cured ink resistant to damage by water or other solvents. It also makes it difficult for liquids, including an ink-jet ink to permeate the surface. Without permeating the surface of the cured ink, the ink jet printed ink may be exposed to water and other solvents, severely limiting the durability of the ink jet printed image.

In order to absorb ink jet ink, the cured coating must contain some porosity. Otherwise, the printed ink jet image remains on the surface of the coating leaving it susceptible to dissolution with water or other solvents. For ease of processing, the UV curable ink of the invention incorporates water to disperse the ink components. Preferably, the uncured material contains at least 20% by weight water in order for the cured material to absorb the ink-jet printed ink. Additional water can be added to improve the processability of the uncured material. However, increasing the water content also dilutes the reactive components, reducing the curing capability of the material. Curing becomes impractical when the uncured material contained more than about 45% (by weight) water.

With the addition of water, the only constraint on the remaining components of the UV curable ink;

a) reactive monomers, b) oligomers (higher molecular weight reactive compounds), c) pigment, and d) sensitizers, is that they must disperse in water. Consequently, by definition, they are hydrophilic to some degree. Following that one requirement, components can be freely substituted to obtain the desired properties, i.e., more flexible compounds can be used to improve flexibility, adhesion promoters can be used to improve adhesion, etc.

Any water dispersible acrylate monomer is appropriate for use in a UV curable coating. These compounds include, but are not limited to, acrylic amide, acrylic acid, allyl alcohol, dimethyl amino ethyl methacrylate, glycerol-1-allylether, 2-hydroxyethyl methacrylate, N-vinyl-2-pyrrolidinone, 2(2-ethoxyethoxy) ethylacrylate, polyethylene glycol diacrylate, and 2-hydroxypropyl methacrylate. Advantageously both dimethylaminoethyl methacrylate and N-vinyl-2-pyrrolidinone may especially enhance the water resistance because they are similar to amines that are used to fix ink-jet dyes. As mentioned previously, while the water content is critical to create a permeable cured coating, it does also serve to dilute the reactants. Lower equivalent weight (the weight of the molecule divided by the number of acrylate functions per molecule) compounds provide more reactive sites for a given weight. Therefore, compensation for this dilution can be made by using monomers with a low equivalent weight, such as acrylic acid or 2(2-ethoxyethoxy) ethylacrylate. For enhanced curing and adhesion characteristics, an acrylic acid as the monomer is preferred.

Again, any water dispersible acrylate oligomer is appropriate. These compounds include, but are not limited to, urethane acrylates, epoxy acrylates, and polyester acrylates. Since the uncured coating contains a significant amount of unreactive material, the use of larger, multi-acrylates is preferred in order to provide a polymeric backbone to anchor the monomers. For this purpose, a poly(N,N-ethyl acrylamide) may be synthesized by adding acrylic acid with poly(ethylene imine). A poly(ethylene imine) serves as a mordant thereby binding the ink jet ink, and reacts with an acrylic acid forming a reactive polymer. However, 100% substitution with acrylic acid leads to a decrease in the resolution of the ink-jet printed image. Leaving unsubstituted amines in the coating leads to yellowing during exposure to UV radiation, so poly(N,N-ethyl acrylamide-N,N-ethyl glucolamide) was used as an oligomer in the formula. This oligomer is obtained by reacting poly(ethylene imine) with glycolic acid sufficient to occupy half of the amines in the poly(ethylene imine) followed by addition of enough acrylic acid to occupy the remaining amines. Yellowing is prevented by ensuring the presence of enough acid equivalents to occupy all of the amine equivalents, and a sharp ink-jet printed image is ensured by ensuring that half of the amines are free from polymerizable acrylate functions. Further, addition of up to about 5% (by weight) of a urethane acrylate oligomer can be made as an adhesion promoter, without compromising the curing characteristics of the applied material.

Any water dispersible pigment with the desired characteristics can be used in the formula. The pigment improves the processing of the uncured material, by absorbing the excess water and thickening the mixture. In the cured, dried coating, the pigment lends color, opacity, and absorbs the solvent in the ink-jet ink. For a white pigment, these include chemicals such as $Al(OH)_3$, $CaSO_4$, $SiO_2$, $TiO_2$ and minerals such as barytes (barium sulfates) bentonite (magnesium aluminum silicate), and kaolin clay (aluminum silicate). Both barium sulfate and calcium sulfate have some ability to fix ink-jet dye. Since the coating is cured with UV radiation, UV transparent pigments are preferred so that thicker coatings can be derived, but for thinner coatings, UV reflective or opaque pigments can be used. Thicker coatings can be produced using the white, UV transparent, aluminum oxide trihydrate. Since this pigment is alkaline, a brighter, more colorful, ink-jet image is obtained if the mixture is neutralized with acid.

Another method of enhancing the hydrophilic character of the screen printed ink is to add an additional “dry” material. This material is incorporated into the polymeric matrix much like a pigment, but does not actually add opacity or color. Cellulose provides an excellent ink-jet ink receiving material. Advantageously, cellulose also provides an excellent ink-jet ink agent in silk screen inks. Addition of some amount of cellulose also serves to enhance the absorbance of a UV curable screen printing ink.

Any water dispersible, UV initiator that is compatible with the chemicals in the mixture can be used.

Another preferred formation is:

| Chemical | Range (% by weight) | Production (% by weight) |
|---|---|---|
| water | 15–50 | 30 |
| acrylic acid | 0–13 | 7.5 |
| urethane acrylate (SARTOMER CN966H90) | 0–5 | 2.5 |
| poly(N,N-ethyl acrylamide-N,N-ethl glucolamide) | 0–10 | 3 |

-continued

| Chemical | Range (% by weight) | Production (% by weight) |
|---|---|---|
| aluminum trihydroxide | 40–60 | 55 |
| sensitizer | 1–5 | 1 |
| hydrochloric acid | 0.5–4 | 0.6 |

One aspect of the invention includes a method of printing an image which includes obtaining a substrate, preparing a coating mixture which includes a substantially reactive hydrophilic species, a sensitizer to increase the susceptibility of the hydrophilic species to polymerization in response to an initiator, and a solvent. The coating mixture is coated onto a surface of the substrate and polymerization of the hydrophilic species is initialized. The polymerized coating provides an ink receiving surface. The substrate is placed into an ink jet printer and an image is applied to the ink receiving surface using an substantially aqueous ink applied by the ink jet printer.

This coating can be applied with silk screening techniques and cured with UV radiation. In one preferred embodiment, a 140 mesh screen leaves a coating of sufficient thickness to absorb all of the ink-jet solvent during printing, leaving a surface that is immediately dry to the touch. Curing is accomplished at 300 Watts per inch (WPI) and 40 feet per minute (FPM) although curing may be accomplished with less exposure.

FIG. 1 is a simplified diagram showing a screen printing apparatus 10 in accordance with the invention. Apparatus 10 includes a mechanism 12 for positioning substrates 14 in a screen printing device 16. In the embodiment shown in FIG. 1, mechanism 12 comprises a conveyor belt 18 which moves substrates 14 in the direction indicated by arrow 20. Device 16 screen prints in a screen printable ink, such as those set forth herein, onto substrate 14. In one embodiment, the screen printed ink is cured using an ultraviolet light source 22. In one preferred embodiment, substrate 14 comprises an identification card or other card formed of PVC which carries indicia. In another embodiment, substrate 14 comprises a CD recordable. Device 16 includes an ink source 30, an actuator mechanism 32 and a screening mechanism 34 which screen prints the ink from ink source 30.

Figure 2:
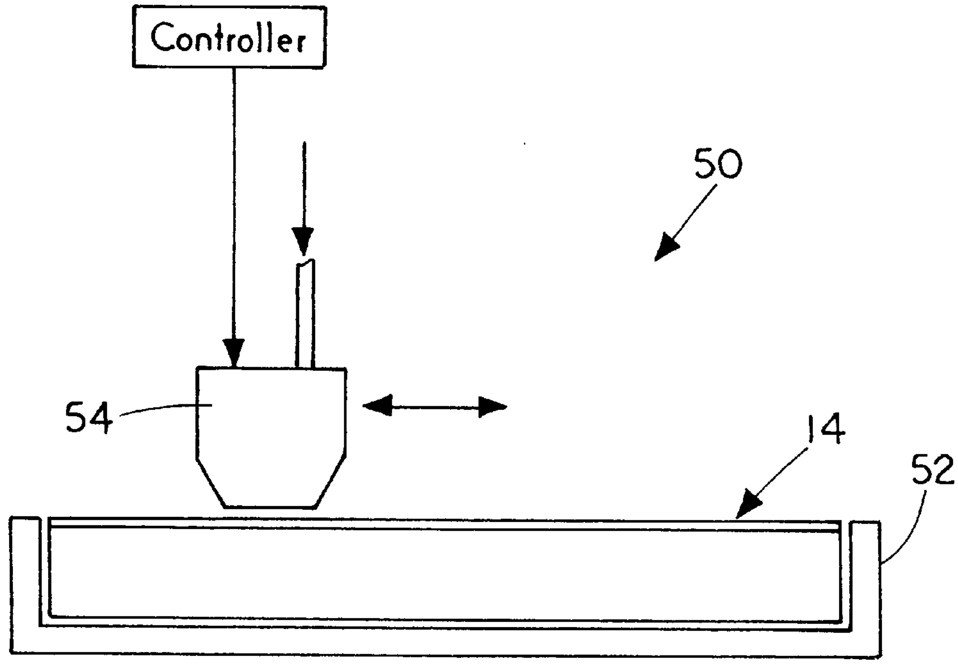
FIG. 2 is a simplified diagram of a printing device for printing onto a substrate in accordance with the present invention.

FIG. 2 is a simplified diagram of printing device 50 in accordance with one embodiment of the invention for printing onto substrate 14. Device 50 includes substrate holder 52 and ink jet print head 54.

In another embodiment, a reactive amine is used to modify the hydrophilic character of a commercially available UV cured screen printed ink and thereby provide the ink receiving surface. In one embodiment, a screen printable ink is obtained for modification in accordance with the present invention. One preferred ink is BC-100 available from KolorCure of Batavia, Ill. A talc pigment, also available from KolorCure, is added to the BC-100 ink along with N-vinyl pyrrolidinone. When printed on using are ink jet printer, this ink receiving surface provides a very high quality ink jet printed image that dries almost immediately after printing. However, this image may not be sufficiently water resistant for some applications.

A formula based on a hydrophilic monomer yields an ink jet printable receiving surface after UV polymerization. The formula is:

acrylic acid-about 80% by weight;

oligomer (a screen print ink component) -about 10% by weight;

silicon dioxide pigment-about 6% by weight; and sensitizer (UV polymerization initiator)-about 4% by weight.

In other embodiments, acrylic acid is replaced with another hydrophilic monomer, such as the ones listed previously.

As another example, a formula based entirely on the reactive acrylate of poly(ethylene imine), is:

| Chemical | Range (% by weight) |
|---|---|
| poly (ethylene imine) | 3–5 |
| acrylic acid | 3–5 |
| aluminum trihydroxide | 40–60 |
| sensitizer from Kolorcure | 1–4 |
| water | 30–40 |

As another example, additional pigments can be added to assist with the absorption of the ink jet ink solvents and to provide color to the cured coating. However, addition of excess pigments may reduce the durability of the coating by reducing the relative amount of polymer. In one preferred embodiment, a suitable coating is in accordance with the following formula:

| Chemical | Range (% by weight) |
|---|---|
| poly(ethylene imine) | 3.5–4.0 |
| acrylic acid | 7–8 |
| $Al(OH)_3$ | 40–50 |
| $TiO_2$ | 0–10 |
| sensitizer | 1–5 |
| hydrochloric acid | 0.5–4 |
| water | 30–40 |

Although the present invention has been described with reference to preferred embodiments, workers skilled in the art will recognize that changes may be made in form and detail without departing from the spirit and scope of the invention. Additionally the invention may be modified such that a substrate is formed directly from a suitable formulation. Thus, the substrate can be printed on with an ink jet printer and a coating is not required. In general, the invention provides a large oligomer having many active sites, preferably every other site or more on the order of 700 active sites per molecule. This is quite different from standard inks in which there are only a few active sites per molecule. The solvent provides the desire porosity but also make the mixture less reactive. This is overcome using the increased number of active sites. Other types of solvents, monomers, oligomers, etc. may be used in accordance with the invention.

What is claimed is:

1. A method of printing an image with an ink jet printer, comprising:

obtaining a substrate having a surface;

preparing a coating mixture which includes a reactive water dispersible species, a sensitizer to increase the susceptibility of the water dispersible species to polymerization in response to an initiator, and a solvent;

coating the surface of the substrate with the coating mixture;

initiating polymerization of the substantially reactive water dispersible species by applying the initiator to the coating;

placing the coated substrate into an ink jet printer following the step of initiating; and applying the image to the coated substrate using a substantially aqueous ink applied by the ink jet printer whereby the ink is absorbed into the polymerized coating such that a printed surface of the substrate is substantially dry following application of ink.

2. The method of claim 1 wherein the step of coating comprises applying the coating mixture using a screen printing process.

3. The method of claim 1 wherein the step of obtaining a substrate comprises obtaining an identification card.

4. The method of claim 1 wherein the step of obtaining a substrate comprises obtaining a CD recordable.

5. The method of claim 1 wherein the sensitizer comprises an ultraviolet sensitizer and the step of initiating polymerization comprises illuminating the coated surface with ultraviolet radiation.

6. The method of claim 1 wherein the solvent comprises water.

7. The method of claim 6 wherein water as more than about 20% by weight of the coating mixture prior to the step of initiating polymerization.

8. The method of claim 1 including the step of evaporating the solvent following the step of initiating polymerization.

9. The method of claim 1 wherein the reactive water dispersible species includes a monomer.

10. The method of claim 9 wherein the monomer comprises acrylic acid.

11. The method of claim 1 wherein the reactive water dispersible species includes an oligomer.

12. The method of claim 1 wherein the oligomer comprises poly (N-ethyl-acrylamide).

13. The method of claim 1 including adding a pigment to the coating during the step of preparing the coating.

14. The method of claim 1 wherein the sensitizer is hydrophilic.

15. A method of coating a substrate using an ink jet printing mixture for receiving ink jet printing to form an image on the mixture when coated on a substrate, the ink jet printing mixture comprising:

a reactive water dispersible species;

a sensitizer to increase the susceptibility of the water dispersible species to polymerization when exposed to an initiator; and a solvent mixed to a consistency suitable for inkjet printing, the method comprising providing a substrate;

coating the mixture coated onto the substrate, thereafter applying the initiator to cure the mixture on the substrate, the solvent causing the cured mixture to have sufficient porosity to allow the ink jet ink to penetrate the cured mixture and thereby reduce the susceptibility of the printed ink to smear.

16. The method of claim 15 wherein the solvent in the ink jet printing mixture comprises water.

17. The method of claim 16 wherein the water is more than about 20% of the total weight of the ink jet printing mixture.

18. The method of claim 16 wherein the water is less than 45% of the total weight of the ink jet printing mixture.

19. The method of claim 15 wherein the sensitizer in the ink jet printing mixture comprises a UV sensitizer, and the initiator comprises UV radiation.

20. The method of claim 15 wherein the water dispersible species of the ink jet printing mixture includes a monomer.

21. The method of claim 15 wherein the water dispersible species in the ink jet printing mixture includes a oligomer.

22. The method of claim 15 wherein the water dispersible species in the ink jet printing mixture is hydrophilic.

* * * * *

UNITED STATES PATENT AND TRADEMARK OFFICE

CERTIFICATE OF CORRECTION

PATENT NO. : 6,270,858 B1
DATED : August 7, 2001
INVENTOR(S) : Bradley A. Paulson It is certified that error appears in the above-identified patent and that said Letters Patent is hereby corrected as shown below:

Column 7,
Line 19, cancel "as" and insert -- is --.

Column 8,
Line 12, cancel "coated".

Signed and Sealed this

Twenty-eighth Day of May, 2002

*Attest:*

JAMES E. ROGAN
*Director of the United States Patent and Trademark Office*

*Attesting Officer*